United States Patent
Chen

(10) Patent No.: US 11,041,523 B2
(45) Date of Patent: Jun. 22, 2021

(54) UNIVERSAL JOINT

(71) Applicant: FINE FORGE INDUSTRY CORPORATION, Nantou County (TW)

(72) Inventor: Kuo-Lung Chen, Nantou County (TW)

(73) Assignee: FINE FORGE INDUSTRY CORPORATION, Nantou County (TW)

( * ) Notice: Subject to any disclaimer, the term of this patent is extended or adjusted under 35 U.S.C. 154(b) by 12 days.

(21) Appl. No.: 16/513,062

(22) Filed: Jul. 16, 2019

(65) Prior Publication Data

US 2021/0018037 A1   Jan. 21, 2021

(51) Int. Cl.
*F16C 11/06* (2006.01)

(52) U.S. Cl.
CPC ...... *F16C 11/0661* (2013.01); *F16C 11/0604* (2013.01); *F16C 11/0628* (2013.01); *Y10T 403/32647* (2015.01)

(58) Field of Classification Search
CPC ............ B25B 23/0014; B25B 23/0028; F16C 11/0604; F16C 11/0609; F16C 11/0628; F16C 11/0661; F16D 3/16; F16D 3/18; F16D 3/185; F16D 3/20; Y10T 403/32631; Y10T 403/32647; Y10T 403/32655
USPC ...... 81/177.75; 403/122, 124, 125; 464/149, 464/158
See application file for complete search history.

(56) References Cited

U.S. PATENT DOCUMENTS

| | | | | |
|---|---|---|---|---|
| 2,924,954 | A * | 2/1960 | Panhard | F16D 3/185 464/88 |
| 5,738,586 | A * | 4/1998 | Arriaga | B25B 23/0028 81/177.75 |
| 6,059,480 | A * | 5/2000 | Maughan | F16C 11/0609 403/122 |
| 6,152,826 | A * | 11/2000 | Profeta | F16D 3/185 464/106 |
| 6,572,480 | B1 * | 6/2003 | Huang | F16D 3/18 192/108 |
| 7,117,769 | B2 * | 10/2006 | Somers | B25B 23/0014 81/177.75 |
| 9,587,436 | B2 * | 3/2017 | Perry | F16D 3/185 |
| 10,253,820 | B2 * | 4/2019 | Chustz | F16D 3/185 |
| 10,408,274 | B2 * | 9/2019 | Marchand | F16D 3/20 |
| 2005/0119056 | A1 * | 6/2005 | Chien | F16D 3/185 464/158 |
| 2006/0159375 | A1 * | 7/2006 | Krishnan | F16C 11/0604 384/192 |

(Continued)

FOREIGN PATENT DOCUMENTS

WO   WO-2018221170 A1 * 12/2018 ............ F16D 3/20

*Primary Examiner* — Josh Skroupa
(74) *Attorney, Agent, or Firm* — Muncy, Geissler, Olds & Lowe, P.C.

(57) ABSTRACT

A universal joint includes a driving portion and a joint head. The driving portion includes a ball nest and a polygonal column disposed within the ball nest. The joint head includes a working end portion and a ball head portion, and the ball head portion is rotatably and swingably disposed within the ball nest. A shaped of the ball head portion corresponds to a shaped of the ball nest, and the polygonal column is co-rotatable with the ball head portion. The ball head portion including a polygonal groove, and the polygonal column is inserted within the polygonal groove.

9 Claims, 17 Drawing Sheets

(56) References Cited

U.S. PATENT DOCUMENTS

2020/0124109 A1\* 4/2020 Goff .......................... F16D 3/18

\* cited by examiner

UNIVERSAL JOINT

BACKGROUND OF THE INVENTION

Field of the Invention

The present invention relates to a universal joint.

Description of the Prior Art

A universal joint is configured to be assembled with a driving tool so that the driving tool can be operated at various environments.

A conventional universal joint includes a tool sleeve and a seat. A ball head of the tool sleeve includes a plurality of receiving grooves which have respective rollers disposed therewithin, and the seat includes a plurality of engaging slots. Each of the plurality of receiving grooves faces to one of the plurality of engaging slots, and the respective rollers are engaged with the plurality of engaging slots so as to move therewithin when the tool sleeve is rotated or swung relative to the seat.

The seat and the tool sleeve of the conventional universal joint are co-rotatable with each other by engaging the respective rollers with the plurality of engaging slots. However, the respective rollers are easy to be rotated within respective one of the plurality of receiving grooves, which results in poor torque transmission efficiency, narrow adjustable range and poor structural stability.

The present invention is, therefore, arisen to obviate or at least mitigate the above-mentioned disadvantages.

SUMMARY OF THE INVENTION

The main object of the present invention is to provide a universal joint which has two cooperative rotatable mechanisms for easy adjustment and good structural stability.

To achieve the above and other objects, the present invention provides a universal joint, including a driving portion and a joint head. The driving portion includes a ball nest and a polygonal column disposed within the ball nest. The joint head includes a working end portion and a ball head portion, and the ball head portion is rotatably and swingably disposed within the ball nest. A shape of the ball head portion corresponds to a shaped of the ball nest and the ball head portion is co-rotatable with the polygonal column. The ball head portion includes a polygonal groove, and the polygonal column is inserted within the polygonal groove.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
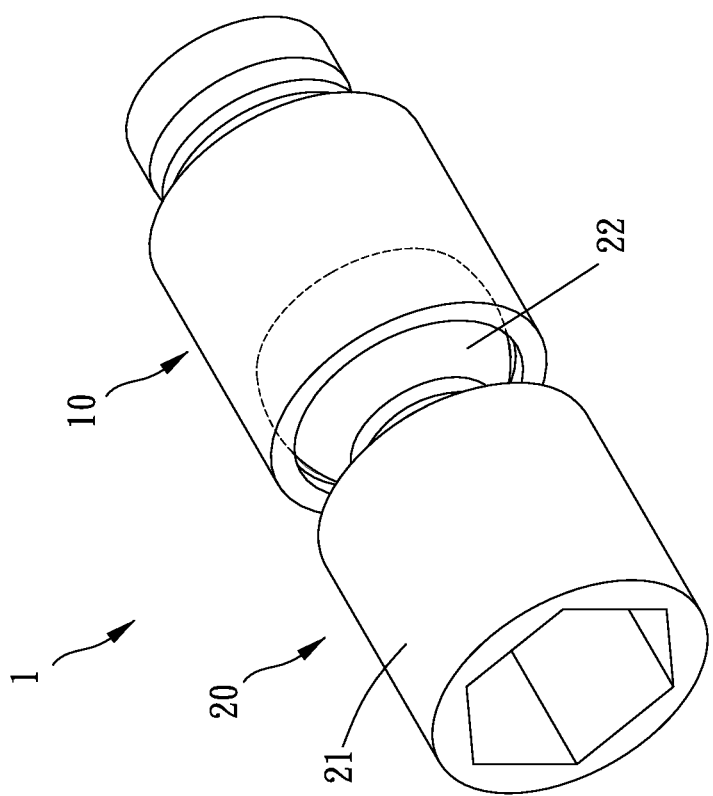
FIG. 1 is a stereogram of a first preferable embodiment of the present invention.

Please refer to FIGS. 1 to 9 for a first preferable embodiment of the present invention. A universal joint 1 of the present invention includes a driving portion 10 and a joint head 20.

The driving portion 10 includes an assembling hole 50 configured to be assembled with a power tool, and the driving portion 10 is drivable by the power tool, such as impact wrench, ratchet wrench or other pneumatic tools, electrical tools or hand tools. The driving portion 10 includes a ball nest 11 and a polygonal column 12 disposed within the ball nest 11. The joint head 20 includes a working end portion 21 and a ball head portion 22, and the ball head portion 22 is rotatably and swingably disposed within the ball nest 11. A shape of the ball head portion 22 corresponds to a shape of the ball nest 11. In other embodiments, the ball nest and the ball head portion may have polygonal structures corresponding to each other, such as a polygonal concave and a polygonal convex. In this embodiment, a contour of the ball head portion 22 is semi-circular, and the ball head portion 22 is co-rotatable with the polygonal column 12. The ball head portion 22 includes a polygonal groove 23, and the polygonal column 12 is inserted within the polygonal groove 23. Therefore, the joint head 20 is stably and smoothly swingable and rotatable relative to the driving portion 10, through two cooperative rotatable mechanisms (the ball head portion 22 is rotatably connected with the ball nest 11 and the polygonal column 12 is rotatably connected with the polygonal groove 23), so as to have a predetermined angle therebetween, and the universal joint 1 can bear high torque.

Figure 2:
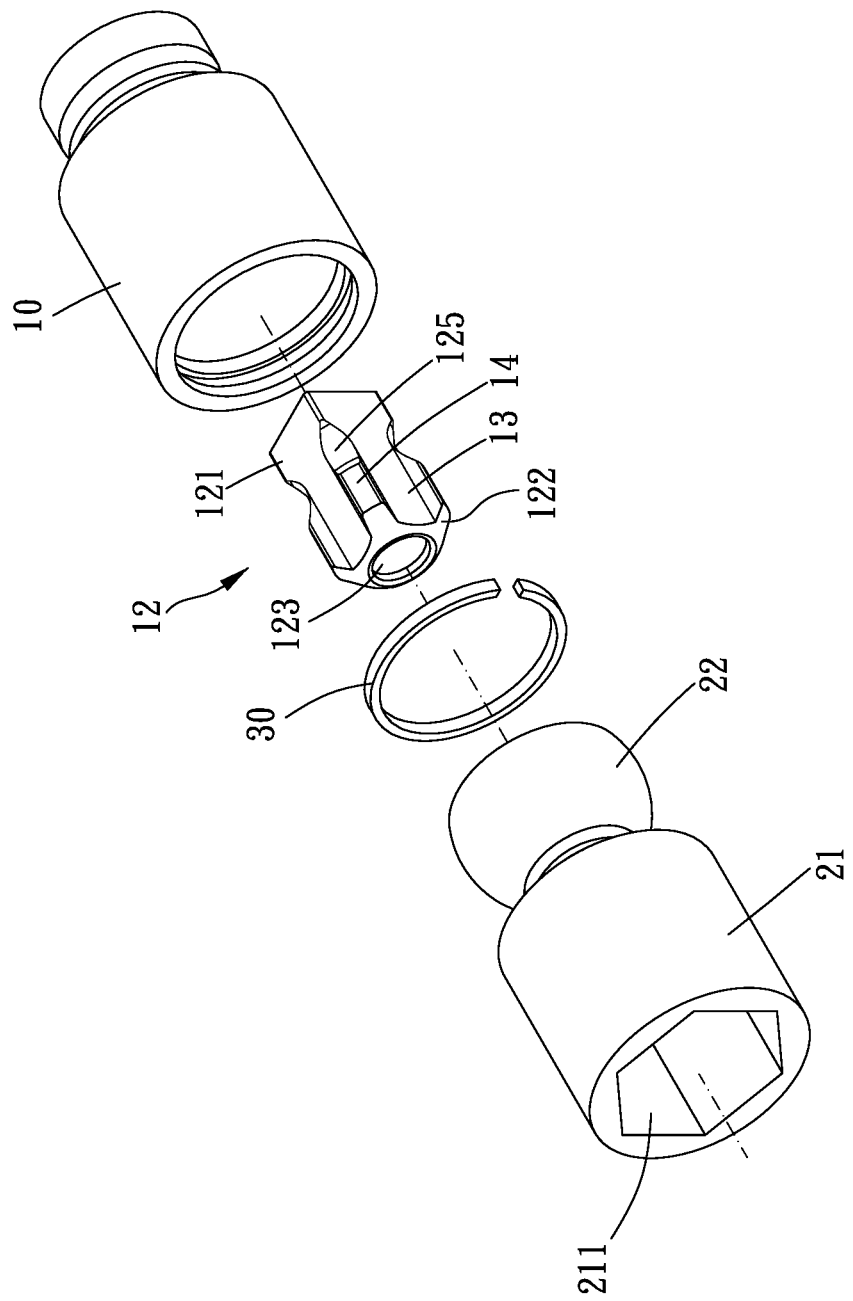
FIG. 2 is a breakdown drawing of the first preferable embodiment of the present invention.
Figure 3:
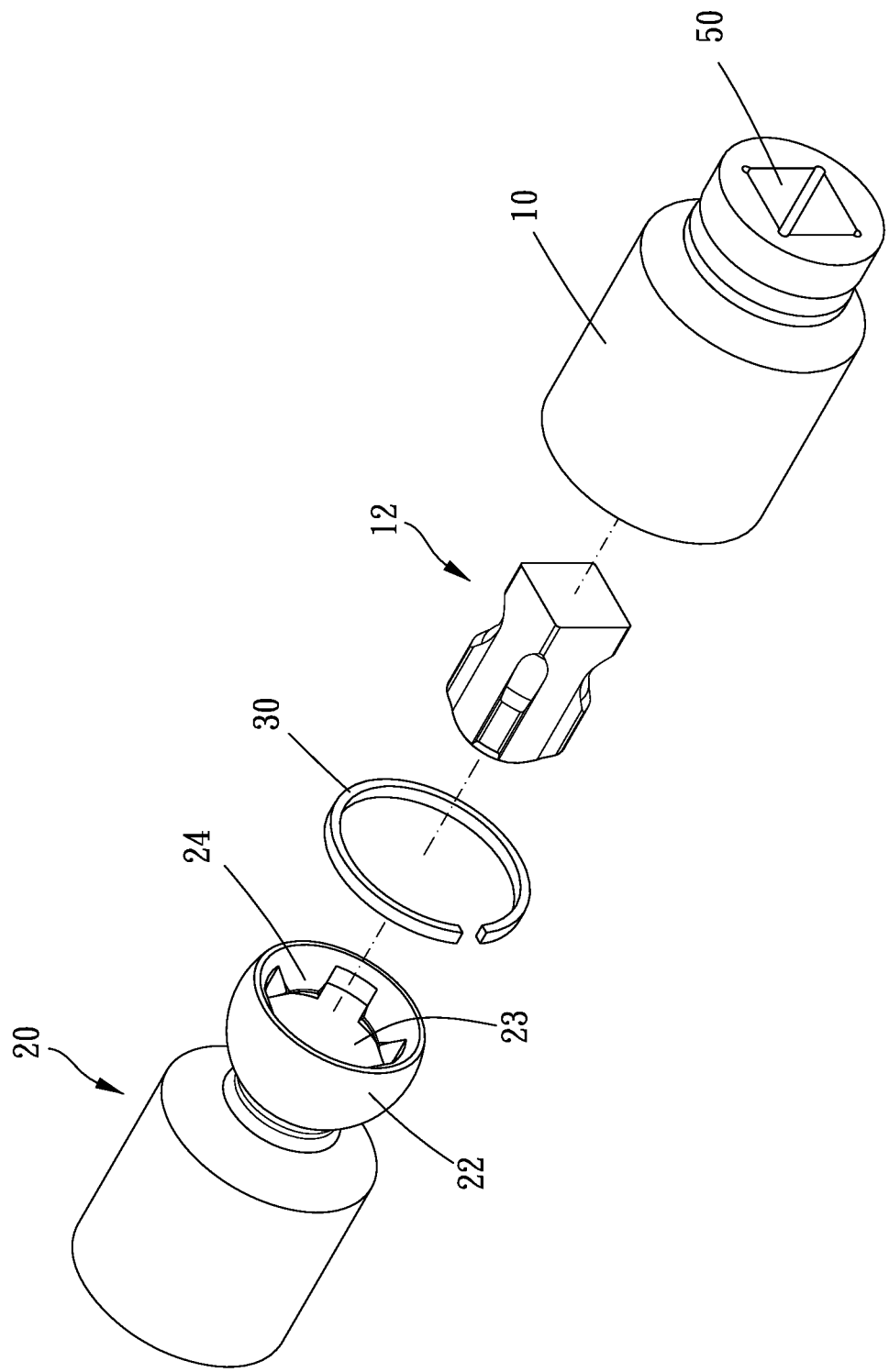
FIG. 3 is another breakdown drawing of the first preferable embodiment of the present invention.
Figure 4:
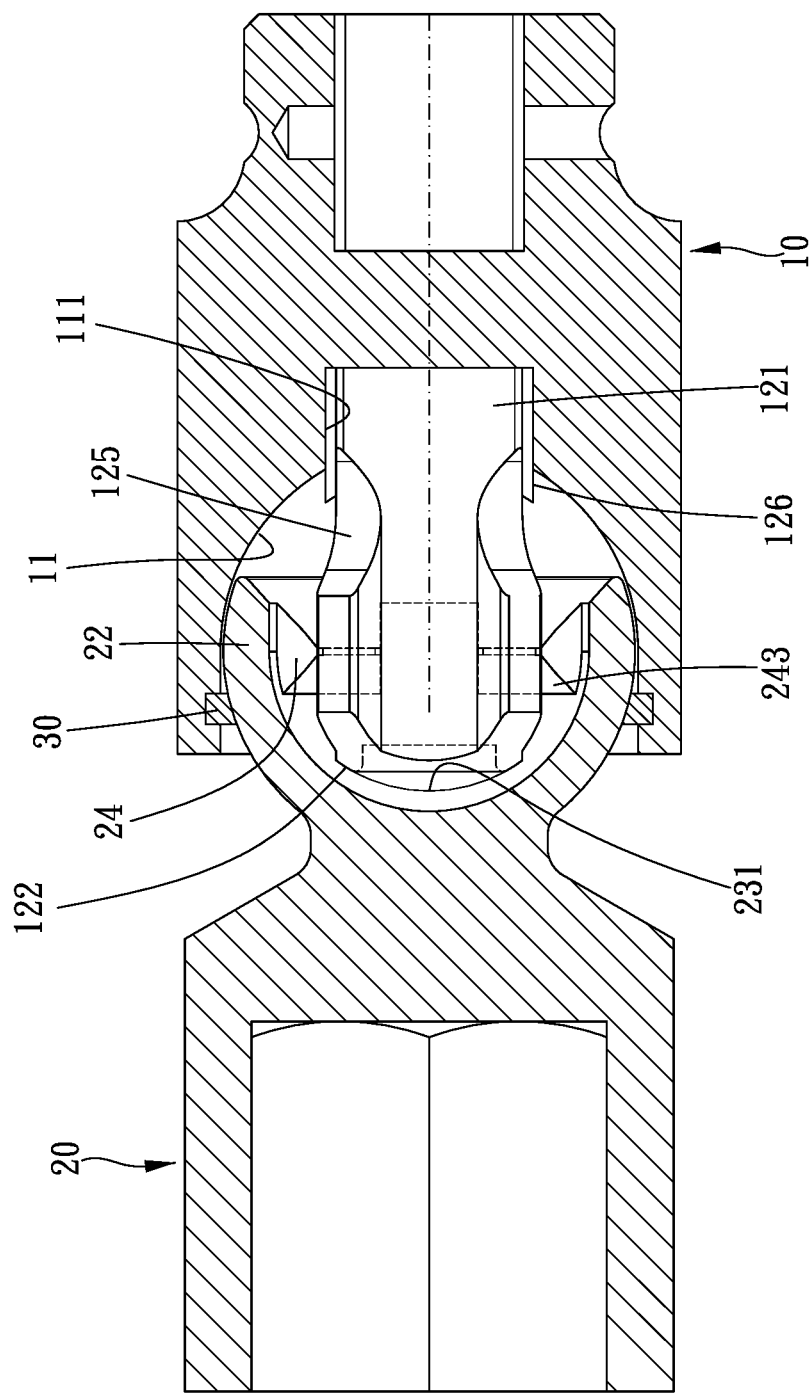
FIG. 4 is a cross-sectional view of the first preferable embodiment of the present invention.
Figure 5:
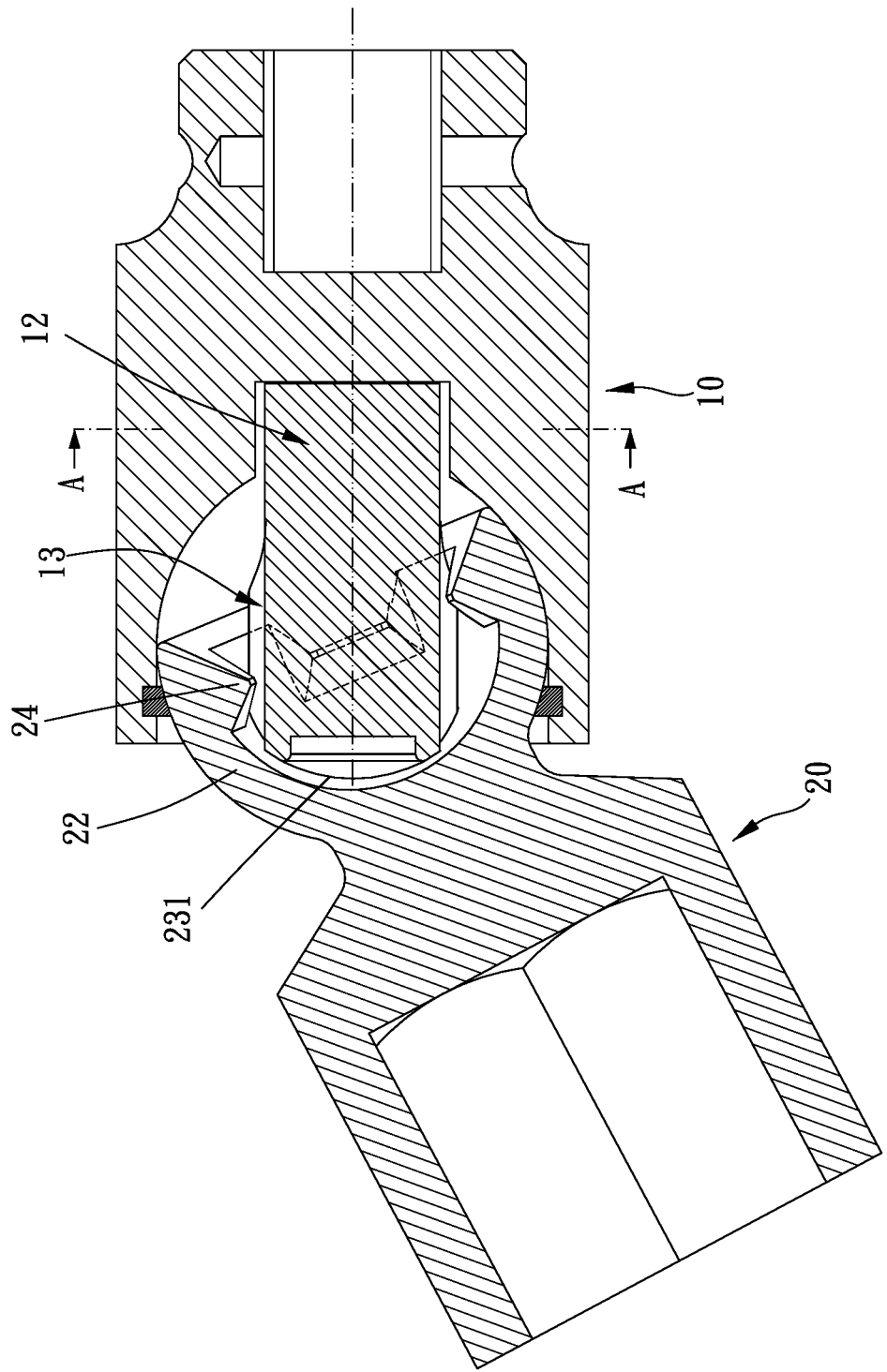
FIG. 5 is a cross-sectional view of the first preferable embodiment of the present invention when a joint head is swung relative to a driving portion.
Figure 6:
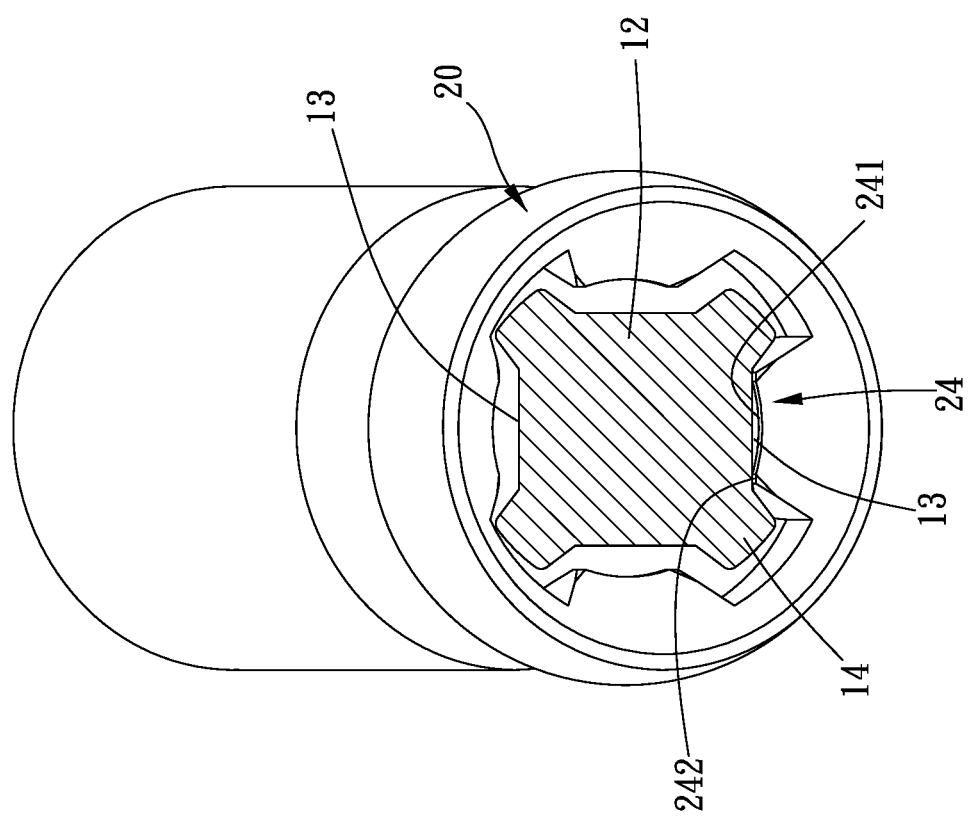
FIG. 6 is another cross-sectional view of the first preferable embodiment of the present invention.
Figure 7:
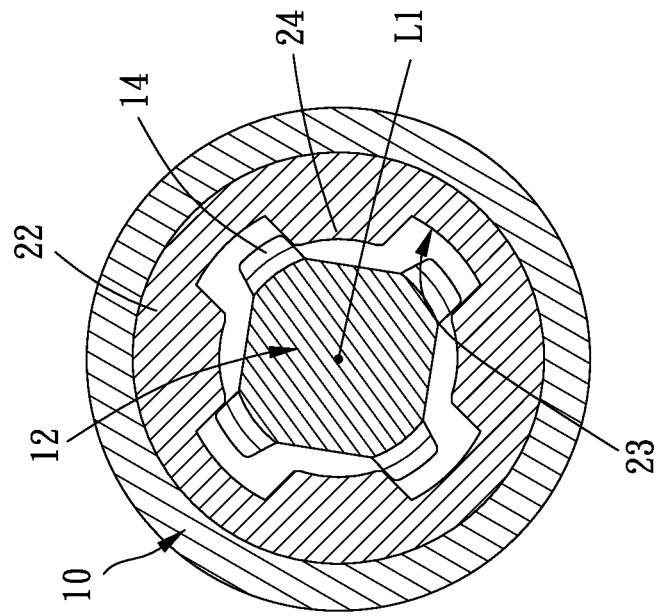
FIGS. 7 and 8 are schematic diagrams of the first preferable embodiment of the present invention when the joint head and the driving portion are rotated relative to each other.
Figure 8:
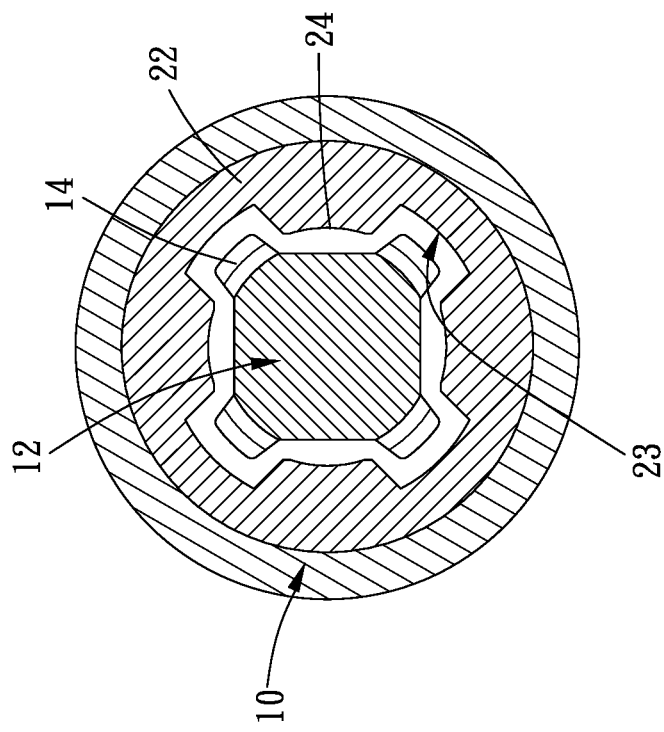
Figure 9:
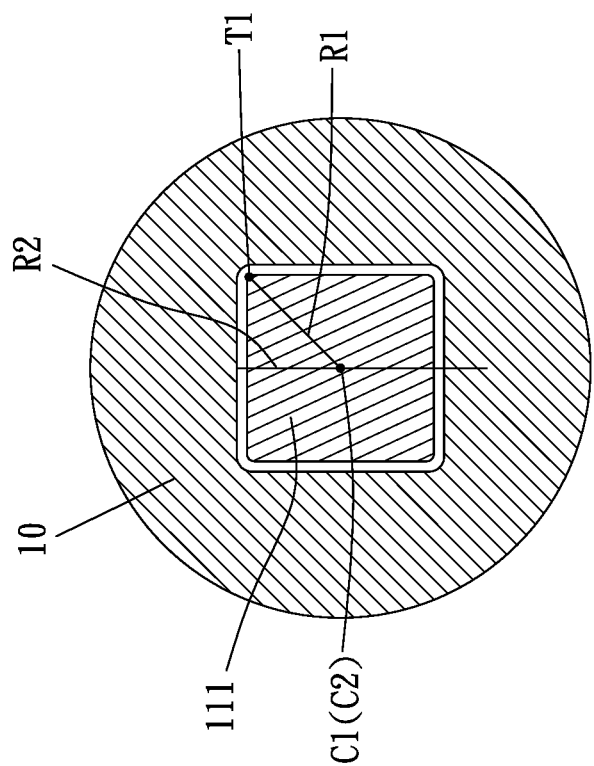
FIG. 9 is a cross-sectional view taken by A-A section of FIG. 5.
Figure 10:
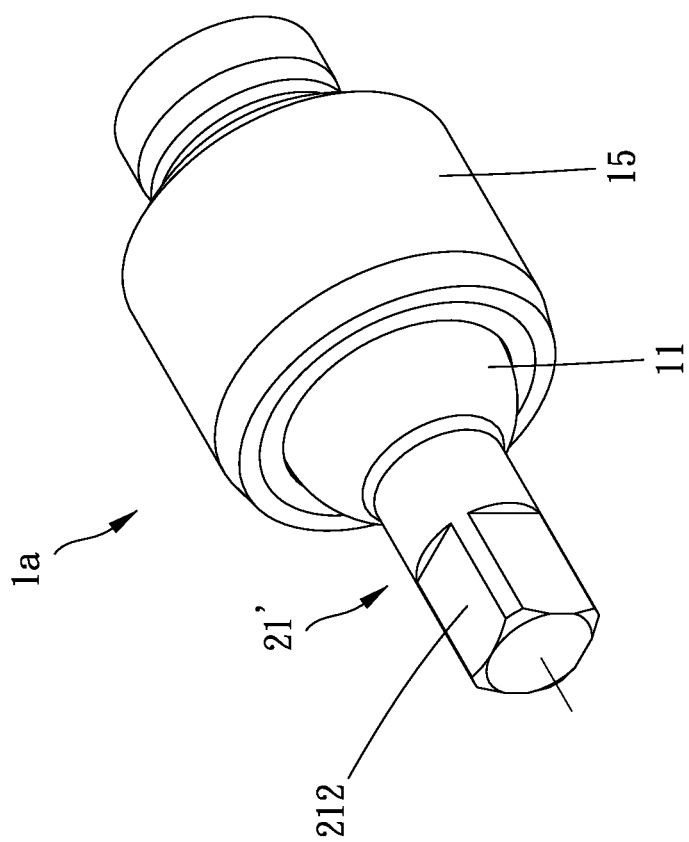
FIG. 10 is a stereogram of a second preferable embodiment of the present invention.
Figures 11, 11A:
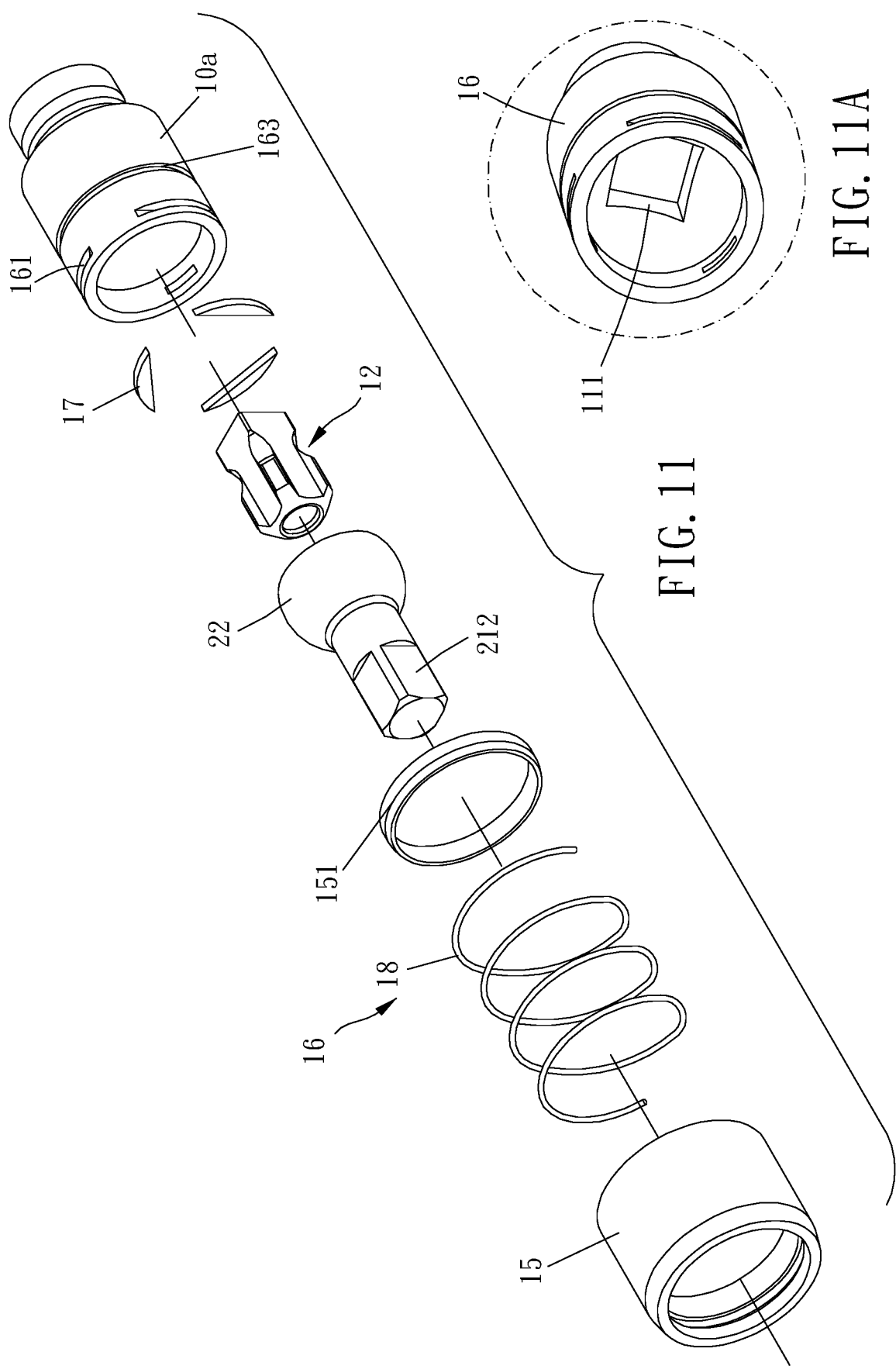
FIG. 11 is a breakdown drawing of the second preferable embodiment of the present invention.
FIG. 11A is a stereogram of a driving portion of the second preferable embodiment of the present invention.
Figure 12:
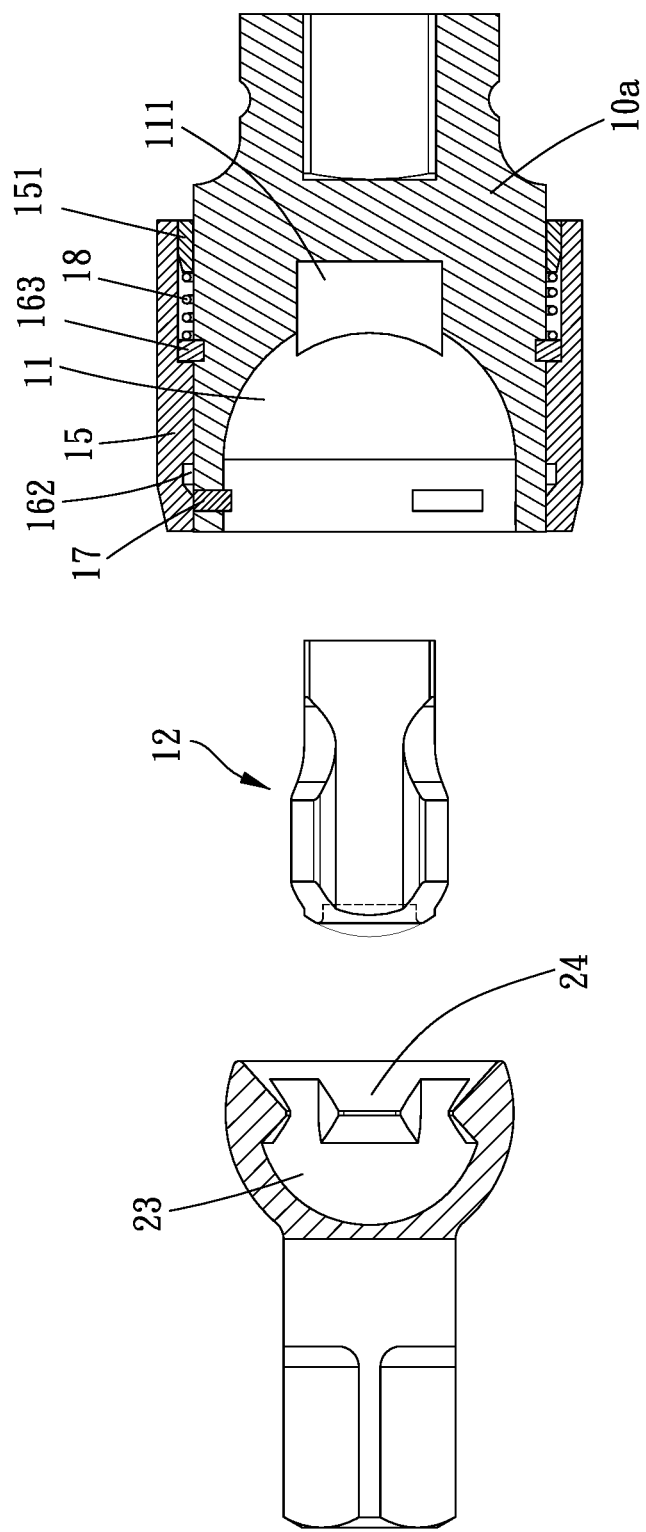
FIG. 12 is a cross-sectional breakdown drawing of the second preferable embodiment of the present invention.
Figure 13:
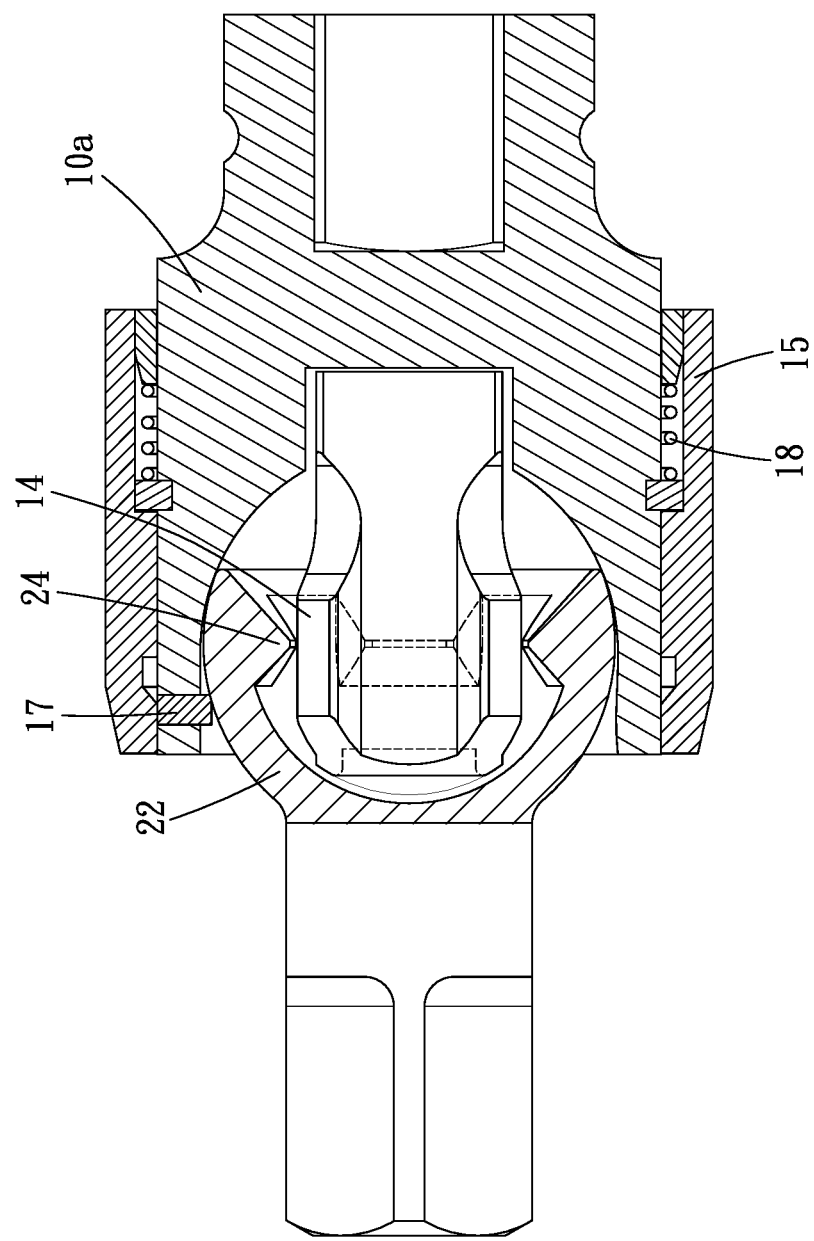
FIG. 13 is a cross-sectional view of the second preferable embodiment of the present invention.
Figure 14:
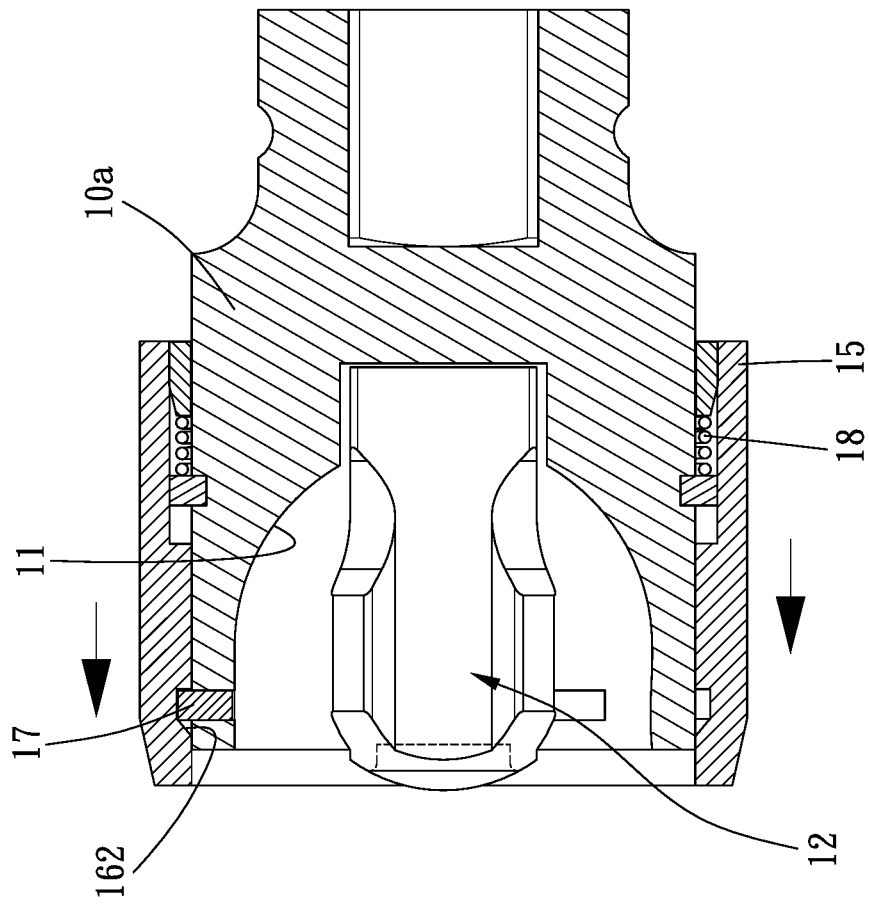
FIG. 14 is a schematic diagram of the second preferable embodiment of the present invention when a joint head is disassembled from the driving portion.
Figure 14:
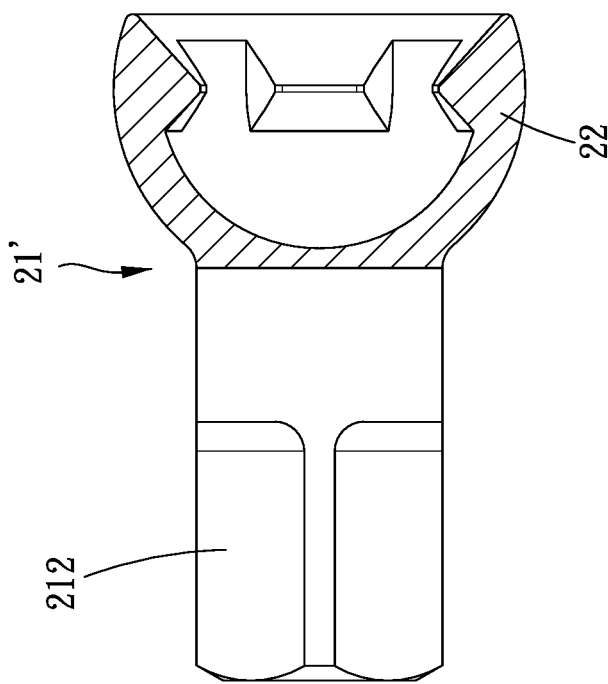
Figure 15:
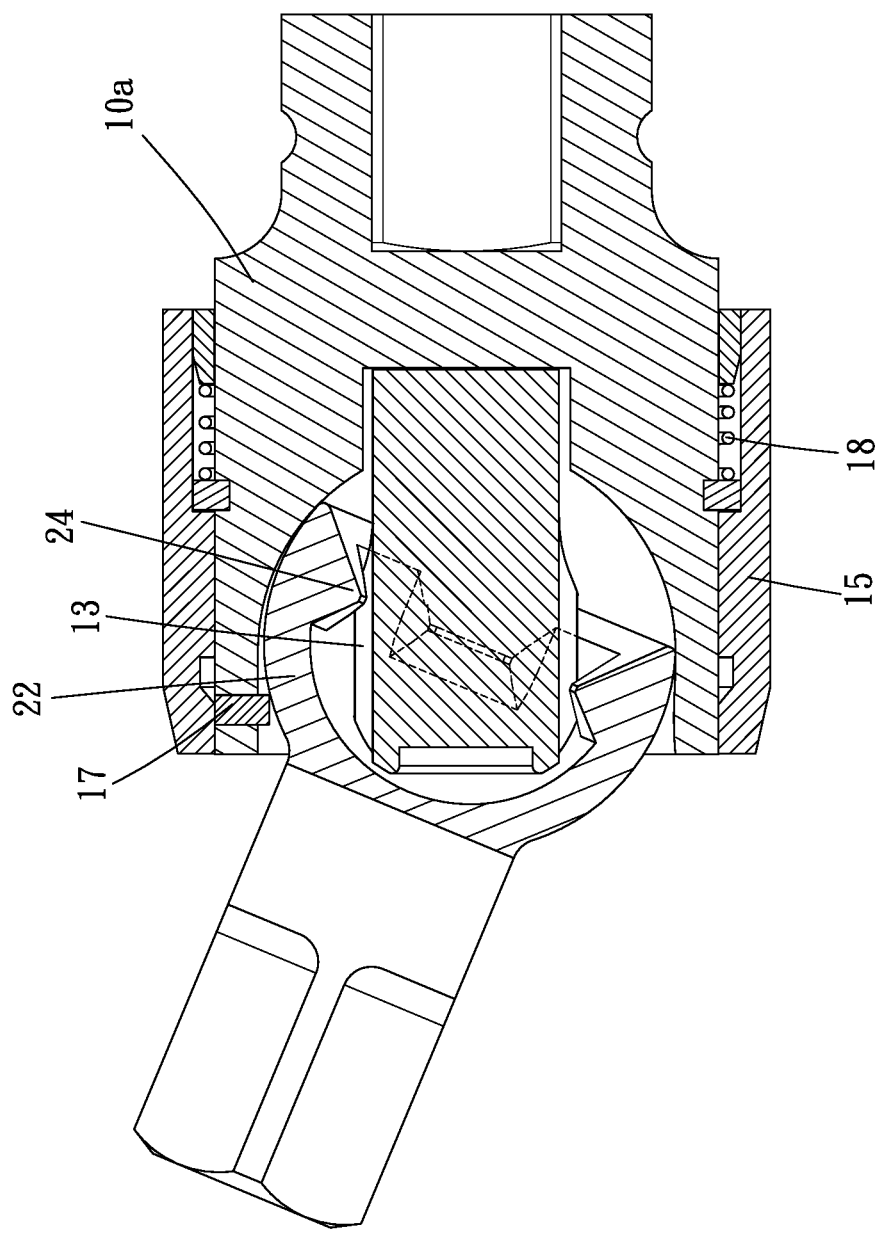
FIG. 15 is a cross-sectional view of the second preferable embodiment of the present invention when the joint head is swung relative to the driving portion.
Figure 17:
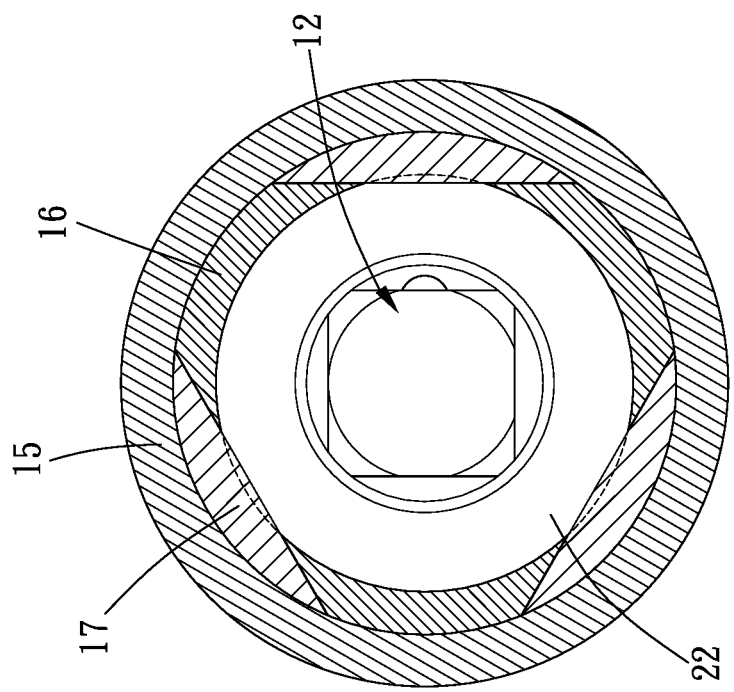
FIG. 17 is a cross-sectional view of the second preferable embodiment of the present invention when the ball head portion is restricted.
Figure 16:
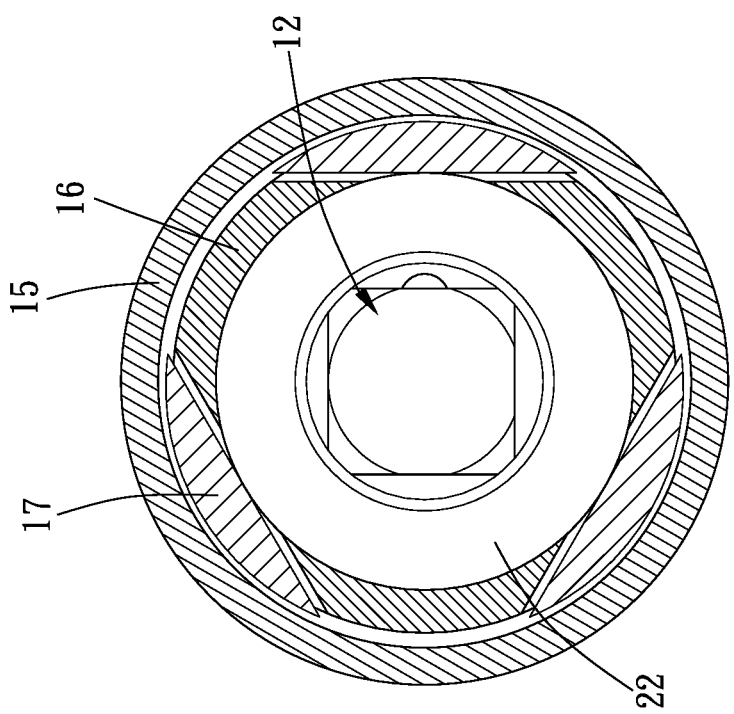
FIG. 16 is a cross-sectional view of the second preferable embodiment of the present invention when a ball head portion is free of restriction.

The working end portion 21, 21' is a socket with a polygonal hole 211 (as shown in FIG. 2) which is configured to be assembled with a workpiece or a polygonal head 212 (as shown in FIG. 10). The working end portion is replaceable according to various requirements.

One of the ball nest 11 and the polygonal column 12 has a square hole, and the other of the ball nest 11 and the polygonal column 12 has a square column which is releasably inserted into the square hole. In this embodiment, the ball nest 11 has the square hole 111 and the polygonal column 12 has the square column 121. The universal joint 1 is configured by multi-piece for easy manufacturing and replacement. In other embodiments, the square hole and the square column may be configured to be in other polygonal shapes; the polygonal column may be integrally formed as a part of the ball nest.

Preferably, a radial cross-sectional dimension of the square column 121 is smaller than a radial cross-sectional dimension of the square hole 111. Specifically, the square column 121 defines a maximum radius R1, and the maximum radius R1 is a distance from a center C1 of the square column 121 to a vertex Ti of the square column 121; the square hole 111 defines a minimum radius R2, and the minimum radius R2 is a distance from a center C2 of the square hole 111 to a side of the square hole 111, and the maximum radius R1 is smaller than or equal to the minimum radius R2 so that the square column 121 is swingable and rotatable relative to the ball nest 11 within the square hole 111.

The polygonal groove 23 includes an arcuate concave bottom wall 231, the polygonal column 12 includes an arcuate convex end surface 122, and the arcuate convex end surface 122 is abutted against the arcuate concave bottom wall 231 so that the arcuate concave bottom wall 231 and the arcuate convex end surface 122 are, in contact, movable relative to each other. The arcuate convex end surface 122 has a hollow portion 123, and the hollow portion 123 may be a groove, through hole or concave so as to reduce friction for smooth adjustment.

An outer periphery of the square column 121 includes a plurality of dodge slots 125 radially disposed therearound, and each of the plurality of dodge slot 125 corresponds to a turning edge 126 of an opening of the square hole 111, which prevents the turning edge 126 from interfering with movement of the square column 121 and increases an adjustable angle between the square column 121 and the square hole 111.

The polygonal column 12 defines a central axis L1, the polygonal column 12 includes a plurality of slots 13 spacingly disposed around the central axis L1, each of the plurality of slots 13 extends axially. In this embodiment, each of the plurality of slots 13 is parallel to the central axis L1, and a plurality of protruding portions 24 are annularly spaced apart from one another and radially protrude from an inner wall of the polygonal groove 23. A distal end of respective one of the plurality of protruding portions 24 includes at least one concave 241 radially disposed thereon and at least two apex corners 242 located at two opposite sides of the at least one concave 241. When the joint head 20 is swung relative to the driving portion 10, at least one of the at least two apex corners 242 of one of the plurality of protruding portions 24 is abutted against a wall of at least one of the plurality of slots 13. One of the plurality of protruding portions 24 contacts the wall of one of the plurality of slots 13 in a point contact manner, for example, with one of the at least two apex corners 242 (single point contact) or both of the at least two apex corners 242 (multi-point contact), so as to quickly adjust an angle between the driving portion 10 and the joint head 20. The at least one concave 241 is free of contact with walls of the plurality of slots 13 so as to decrease friction for smooth adjustment. Preferably, each of the plurality of protruding portions 24 is a tapered block which is radially tapered inwardly and includes two inclines 243 respectively disposed at its two opposite sides, which increase a swingable range of the ball head portion 22 relative to the polygonal column 12.

The polygonal column 12 further includes a plurality of ribs 14, adjacent two of the plurality of ribs 14 define one of the plurality of slots 13, and each of the plurality of ribs 14 is abutted against one of the plurality of protruding portions 24 when the driving portion 10 is rotated so that the polygonal column 12 and the joint head 20 are co-rotatable with each other.

The universal joint 1 further includes a restricting mechanism 30, and the restricting mechanism 30 is disposed on the ball nest 11 and located between the ball nest 11 and an outer surface of the ball head portion 22. The restricting mechanism 30 may be disposed within a groove of the ball nest 11. In this embodiment, the restricting mechanism 30 is a C-shaped retainer, and the restricting mechanism 30 blocks the ball head portion 22 from departing from the ball nest 11.

Please refer to FIGS. 10 to 17 which show a second preferable embodiment of the present invention. The universal joint 1a further includes a quick release mechanism 16. The quick release mechanism 16 includes a sleeving member 15 and at least one restricting member 17. The sleeving member 15 is sleeved on the driving portion 10a and movable relative to the driving portion 10a. A circumferential wall of the driving portion 10a includes at least one through hole 161, and the at least one restricting member 17 is received within the at least one through hole 161. Each of the at least one the restricting member 17 is abutted against the sleeving member 15 and controllable to partially protrude into the ball nest 11 and be located on the outer surface of the ball head portion 22. In this embodiment, the quick release mechanism 16 includes a plurality of said restricting members 17 and a plurality of said through holes 161, and each of the plurality of said restricting members 17 is received within one of the plurality of said through holes 161. Preferably, the quick release mechanism 16 further includes an elastic member 18, and an inner circumferential wall of the sleeving member 15 includes an annular portion 151 radially extending thereon. The annular portion 151 and the sleeving member 15 may be connected with each other by riveting, pressing or tight fit. In this embodiment, the sleeving member 15 and the annular portion 151 are formed of two pieces assembled with each other. In other embodiments, the sleeving member and the annular portion may be integrally formed of one piece. The circumferential wall of the driving portion 10a further includes a flange 163 radially extending thereon, and the flange 163 and the driving portion 10a may be connected with each other by riveting, pressing or tight fit. In this embodiment, the flange 163 and the driving portion 10a are formed of two pieces assembled with each other. In other embodiments, the flange and the driving portion may be integrally formed of one piece. The elastic member 18 is sleeved on the driving portion 10a and elastically abutted against the annular portion 151 and the flange 163 so as to achieve elastic return effect. The sleeving member 15 includes a receiving groove 162, each of the plurality of said restricting members 17 is abuttable by the ball head portion 22 and controllable to be partially received into the receiving groove 162 so that the ball head portion 22 is releasable from the ball nest 11. Therefore, the ball head portion 22 and the ball nest 11 are quickly assembled with and disassembled from each other. Each of the plurality of said restricting members 17 is shaped as a part of a circle, such as a crescent. In other embodiments, the plurality of said restricting members may be rollers or the like.

Figure 18:
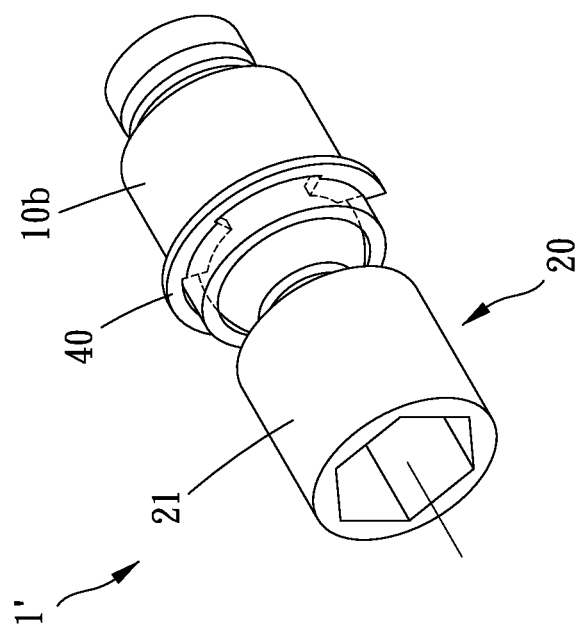
FIG. 18 is a stereogram of a third preferable embodiment of the present invention.
Figure 19:
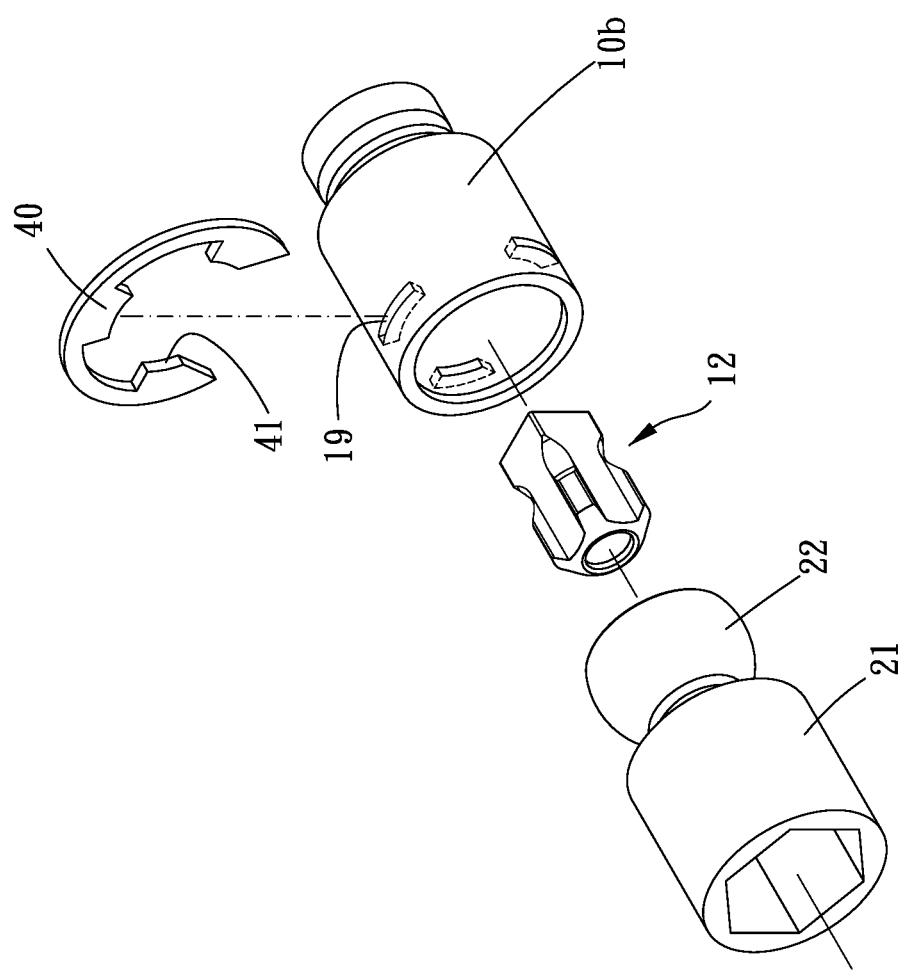
FIG. 19 is a breakdown drawing of the third preferable embodiment of the present invention.

Please refer to FIGS. 18 to 19 which show a third preferable embodiment of the present invention. The universal joint 1' further includes an elastic annular retainer 40. The elastic annular retainer 40 may be C-shaped or inverted-U shaped. The elastic annular retainer 40 is sleeved on the driving portion 10b, and the elastic annular retainer 40 includes at least one restricting projection 41. The driving portion 10b includes at least one perforation 19, the at least one restricting projection 41 penetrates through the at least one perforation 19 and protrudes into the ball nest 11 and is located on the outer surface of the ball head portion 22 so as to prevent the ball head portion 22 from departing from the ball nest 11. Two opposite arms of the elastic annular retainer 40 are pushed outwardly to retract the at least one restricting projection 41 from the ball nest 11 into the at least one perforation 19 so as to disassemble the ball head portion 22.

In summary, the universal joint has two cooperative rotatable mechanisms, the ball head portion is rotatably connected with the ball nest and the polygonal column is rotatably connected with the polygonal groove, so that the joint head and the driving portion are stably and smoothly swingable and rotatable relative to each other so as to have a predetermined angle therebetween, and the universal joint 1 can bear high torque.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A universal joint, including:
   a driving portion, configured to be assembled with a power tool, including a ball nest and a polygonal column disposed within the ball nest; and
   a joint head, including a working end portion and a ball head portion, the ball head portion being rotatably and swingably disposed within the ball nest, a shape of the ball head portion corresponding to a shape of the ball nest, the ball head portion being co-rotatable with the polygonal column, the ball head portion including a polygonal groove, the polygonal column being inserted within the polygonal groove,
   wherein one of the ball nest and the polygonal column has a square hole, and the other of the ball nest and the polygonal column has a square column which is releasably inserted into the square hole, and
   wherein an outer periphery of the square column includes a plurality of dodge slots radially disposed therearound, and each of the plurality of dodge slots corresponds to a turning edge of an opening of the square hole.

2. The universal joint of claim 1, wherein a radial cross-sectional dimension of the square column is smaller than a radial cross-sectional dimension of the square hole.

3. The universal joint of claim 1, wherein the polygonal column defines a central axis, the polygonal column includes a plurality of slots spacingly disposed around the central axis, each of the plurality of slots extends axially, a plurality of protruding portions are annularly spaced apart from one another and radially protrude from an inner wall of the polygonal groove, a distal end of respective one of the plurality of protruding portions includes at least one concave radially disposed thereon and at least two apex corners located at two opposite sides of the at least one concave; wherein when the joint head is swung relative to the driving portion, at least one of the at least two apex corners of one of the plurality of protruding portions is abutted against a wall of at least one of the plurality of slots, and the at least one concave is free of contact with walls of the plurality of slots.

4. The universal joint of claim 3, wherein a radial cross-sectional dimension of the square column is smaller than a radial cross-sectional dimension of the square hole; the working end portion is a socket with a polygonal hole or a polygonal head; the polygonal groove includes an arcuate concave bottom wall, the polygonal column includes an arcuate convex end surface, the arcuate convex end surface is abutted against the arcuate concave bottom wall; the arcuate convex end surface has a hollow portion; the square column defines a maximum radius, the maximum radius is a distance from a center of the square column to a vertex of the square column, the square hole defines a minimum radius, the minimum radius is a distance from a center of the square hole to a side of the square hole, the maximum radius is smaller than or equal to the minimum radius; the polygonal column further includes a plurality of ribs, adjacent two of the plurality of ribs define one of the plurality of slots, each of the plurality of ribs is abutted against one of the plurality of protruding portions when the driving portion is rotated; a contour of the ball head portion is semi-circular.

5. The universal joint of claim 1, wherein the polygonal column defines a central axis, the polygonal column includes a plurality of slots spacingly disposed around the central axis, each of the plurality of slots extends axially, a plurality of protruding portions are annularly spaced apart from each other and radially protrudes from an inner wall of the polygonal groove, and each of the plurality of protruding portions is a tapered block which is radially tapered inwardly and includes two inclines respectively disposed at its two opposite sides.

6. The universal joint of claim 1, further including a restricting mechanism, wherein the restricting mechanism is disposed on the ball nest and located between the ball nest and an outer surface of the ball head portion.

7. The universal joint of claim 1, further including a quick release mechanism, wherein the quick release mechanism includes a sleeving member and at least one restricting member, the sleeving member is sleeved on the driving portion and movable relative to the driving portion, a circumferential wall of the driving portion includes at least one through hole, the at least one restricting member is received within the at least one through hole, each of the at least one restricting member is abutted against the sleeving member and controllable to partially protrude into the ball nest and be located on an outer surface of the ball head portion.

8. The universal joint of claim 7, wherein the quick release mechanism further includes an elastic member, a circumferential wall of the sleeving member includes an annular portion radially extending thereon, the circumferential wall of the driving portion further includes a flange radially extending thereon, the elastic member is sleeved on the driving portion and elastically abutted against the annular portion and the flange, the quick release mechanism includes a plurality of said restricting members and a plurality of said through holes, each of the plurality of said restricting members is received within one of the plurality of said through holes, each of the plurality of said restricting members is shaped as a part of a circle; the sleeving member includes a receiving groove, each of the plurality of said restricting members is abuttable by the ball head portion and controllable to be partially received into the receiving groove so that the ball head portion is releasable from the ball nest.

9. The universal joint of claim 1, further including an elastic annular retainer, wherein the elastic annular retainer is sleeved on the driving portion, the elastic annular retainer includes at least one restricting projection, the driving portion includes at least one perforation, the at least one restricting projection penetrates through the at least one perforation and protrudes into the ball nest and is located on an outer surface of the ball head portion.

* * * * *